Patented Dec. 4, 1945

2,390,326

UNITED STATES PATENT OFFICE 2,390,326

ALLYL AND SUBSTITUTED ALLYL METHACRYLATES

Chessie E. Rehberg, Philadelphia, and Charles H. Fisher, Abington, Pa., assignors to Claude R. Wickard, as Secretary of Agriculture of the United States of America, and his successors in office No Drawing. Application February 4, 1943, Serial No. 474,759

11 Claims. (Cl. 260—486)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to allyl and substituted allyl methacrylates and polymers and interpolymers thereof.

An object of our invention is the preparation of allyl methacrylate and substituted allyl methacrylates, such as beta-methylallyl methacrylate, of relatively high molecular weight and low vapor pressure.

Polymers and interpolymers of allyl and substituted allyl methacrylates have in a controllable degree the properties of fluidity, elasticity, plasticity, tensile strength, electrical resistance, resistance to water and organic liquids and gases, transparency, etc., which are properties highly desirable in the group of substances commonly designated as plastics. Owing to the presence of two instead of one olefinic linkage, the allyl and substituted allyl methacrylates have a characteristic not possessed by the simple alkyl methacrylates, namely, the ability, when polymerized under suitable conditions, to form cross-linked, instead of linear, polymers and interpolymers of increased hardness and decreased solubility (M. A. Pollack, I. E. Muskat and F. Strain, U. S. 2,273,891, February 24, 1942). Hence, the allyl and substituted allyl methacrylates are particularly valuable in that they can be used with other unsaturated monomers to prepare interpolymers of any desired degree of cross-linkage, hardness and insolubility.

Unsaturated hydrocarbons can be produced by the elimination of acetic acid from the acetylated alcohol. For example, 2,4-dimethylpentene-2 is produced by the pyrolysis of acetylated 2,4-dimethylpentanol-3 (Van Pelt and Wibaut, Rec. trav. chim. 57, 1055 (1938), 60, 55–64 (1941); Stevens and Richmond, J. Am. Chem. Soc. 63, 3132–6 (1941)). Also, unsaturated acids can be formed by the pyrolysis of the acetylated derivatives of poly-carboxylic acids. For example, aconitic ester is produced by pyrolysis of the acetylated citric ester, and maleic anhydride is produced by the pyrolysis of acetylated malic anhydride. (Hurd, "Pyrolysis of Carbon Compounds," A. C. S. Monograph 50, New York, Reinhold Publishing Corp., 1929.) Further, the acetylated methyl ester of lactic acid on pyrolysis produces methyl acrylate, but the ethyl ester and higher alkyl esters tend to undergo pyrolytic decomposition with the formation of an unsaturated hydrocarbon and the corresponding acid. (Burns, Jones and Ritchie, J. Chem. Soc. 1935, 400–6, 714–7; U. S. 2,183,357, December 12, 1939; Smith, Fisher, Ratchford and Fein, Ind. Eng. Chem. 34, 473–379 (1942); Claborn, U. S. 2,222,363, November 19, 1940; U. S. 2,229,997, January 28, 1941.) This tendency increases as the molecular weight of the alkyl group increases. Thus, it has not been possible hitherto to produce satisfactorily alkyl acrylates and methacrylates of relatively high molecular weights and high boiling points by this process.

We have found that the presence of an olefinic linkage between the beta and gamma carbon atoms of the alcohol group $$CH_3COOC(R)(CH_3)COO.CH_2.C(R): CH_2$$

Alpha Beta Gamma (Where R is hydrogen or an alkyl group)

decreases the undesirable side reactions encountered in pyrolysis of the alkyl alpha-acetoxy-isobutyrates of higher molecular weight and that, owing to the characteristics of the allyl and substituted allyl radicals and their esters, the allyl and substituted allyl alpha-acetoxy-isobutyrates can be converted readily and in good yields into the allyl and substituted allyl methacrylates, as shown below:

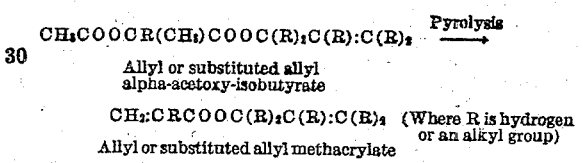

$CH_3COOCR(CH_3)COOC(R)_2C(R):C(R)_2$ $\xrightarrow{Pyrolysis}$

Allyl or substituted allyl alpha-acetoxy-isobutyrate $CH_2:CRCOOC(R)_2C(R):C(R)_2$ (Where R is hydrogen or an alkyl group)

Allyl or substituted allyl methacrylate

Transformation of the allyl or substituted allyl alpha-acetoxy-isobutyrates into the corresponding methacrylates is effected conveniently by passing vapors of the acetoxy-isobutyrate through a pyrolysis tube, usually packed in the heated zone with quartz chips or similar contact material maintained at 400° to 600° C. Below 400° C. the conversion is slow, whereas at temperatures above 600° C., excessive decomposition into undesired by-products occurs.

Although we illustrate our invention with the acetyl derivatives of allyl and substituted allyl alpha-hydroxy-isobutyrates, other similar derivatives, such as the propionyl and benzoyl derivatives (propionates, benzoates) can also be used.

Our invention comprises the following technique. The substances formed as intermediate products in Step 1 and Step 2 below are the subject of other patent applications, filed concurrently herewith.

Step 1.—The conversion of alpha-hydroxy-isobutyric acid and allyl or substituted allyl alcohols into allyl or substituted allyl hydroxy-isobutyrates by esterification, in accordance with the reaction:

$$C(R)_2:C(R)CH_2OH + (CH_3)_2C(OH)COOH \rightarrow$$
$$C(R)_2:C(R)CH_2OCOC(OH)(CH_3)_2 + H_2O$$

(Where R is hydrogen or an alkyl group)

*Step 2.*—The conversion of allyl or substituted allyl hydroxy-isobutyrates into allyl or substituted allyl alpha-acetoxy-isobutyrates by esterification of the alpha-alcoholic hydroxyl group of the isobutyrate radical by means of an acetylating agent, such as acetic anhydride or ketene. The reaction when ketene is used as the acetylating agent is:

$$(CH_3)_2COHCOOCH_2C(R):C(R)_2 + CH_2:CO \rightarrow$$
$$CH_3COOC(CH_3)_2COOCH_2C(R):C(R)_2$$

(Where R is hydrogen or an alkyl group)

*Step 3.*—The conversion of allyl or substituted allyl alpha-acetoxy-isobutyrate into allyl or substituted allyl methacrylate and acetic acid by means of pyrolytic decomposition, in accordance with the reaction:

$$CH_3COOC(CH_3)_2COOCH_2CR:C(R)_2 \rightarrow$$
$$CH_2:C(CH_3)COOCH_2C(R):C(R)_2 + CH_3COOH$$

(Where R is hydrogen or an alkyl group)

*Step 4.*—The conversion of allyl or substituted allyl methacrylate into polymers and interpolymers of more or less complexity and magnitude by means of heat or other aids to polymerization.

The following examples describe in detail a preferred procedure for making the methacrylates mentioned above and their polymers.

Example 1

*Step 1.*—Allyl alpha-hydroxy-isobutyrate is prepared from alpha-hydroxy-isobutyric acid and allyl alcohol by esterification according to the following procedure. A mixture of 104 g. (1 mole) of alpha-hydroxy-isobutyric acid, 174 g. (3 moles) of allyl alcohol and 100 cc. benzene was refluxed under a fractionating column which carried a Betz-Holden type water trap and a reflux condenser at its top. A total of 10.5 cc. water was removed through the trap. Fractionation of the mixture yielded 67.5 g. crude ester boiling at 83°–90° C. under 40 mm. of mercury pressure. The recovered allyl alcohol, together with 1 g. of p-toluenesulfonic acid, was returned to the flask containing the acid residue and the mixture was refluxed for several hours. Fractionation of this mixture yielded an additional 26.5 g. of ester. The total yield was thus 94 g., or 64.5 percent of the theoretical.

Allyl alpha-hydroxy-isobutyrate is a clear, colorless, mobile liquid, with a mild, pleasant odor. It boils at 86° C. under 40 mm. of mercury pressure, has an index of refraction at 20° C. for the yellow sodium line of 1.4308 and a density at 20° C. of 1.0010 g. per cc.

*Step 2.*—Using any of the common acetylating agents, such as ketene or acetic anhydride, allyl hydroxy-isobutyrate is converted into allyl alpha-acetoxy-isobutyrate, as follows. Through a dropping funnel 161.3 g. (1.58 moles) of acetic anhydride was slowly added, with stirring, to 190 g. (1.32 moles) of allyl alpha-hydroxy-isobutyrate containing 2 cc. of phosphoric acid and which was maintained at 80°–110° C. After the addition was completed, the mixture was heated to 100°–110° C. for 30 minutes, after which 5 g. of sodium acetate was added and the mixture was fractionated. In this manner 217 g. of allyl alpha-acetoxy-isobutyrate was obtained, this yield being 88 percent of the theoretical.

Allyl alpha-acetoxy-isobutyrate is a clear, colorless, mobile liquid with a faint, pleasant odor. It boils at 96° C. under 19 mm. of mercury pressure and at 20° C. it has a density of 1.0332 g. per cc. and a refractive index for the yellow sodium line of 1.4280.

*Step 3.*—Allyl alpha-acetoxy-isobutyrate (70.0 g.) was allowed to run at a rate of 60 drops per minute (contact time approximately 4.7 seconds) into a Pyrex tube 30 cm. long and 2.5 cm. outside diameter, and filled with Pyrex fragments. The tube was heated by an electric furnace; the temperature of the furnace was maintained at 475° C. and recorded automatically. The glass pyrolysis tube was provided at the top with a dropping funnel and pressure equalizer for adding the liquid reagent at constant rate. The apparatus was swept out with nitrogen before the reaction was started and a slow current of nitrogen was passed through continuously during the course of the reaction. A small amount of hydroquinone was added to the condensate to prevent premature polymerization. The condensate (67.8 g.) was fractionally distilled under reduced pressure; 58 cc. (mainly acetic acid and allyl methacrylate) was collected at 30° to 50° C. under 23 mm. pressure. Some of the starting material (9.8 g. of allyl alpha-acetoxy-isobutyrate) was recovered by distillation as a high-boiling fraction. Acetic acid was removed from the 60 cc. fraction containing acetic acid and allyl methacrylate by washing with water and sodium carbonate. Redistillation, after drying with anhydrous sodium sulfate and adding 0.2 g. of hydroquinone, yielded 30.8 g. of allyl methacrylate boiling at 67° C. under 50 mm. pressure. The yield of allyl methacrylate based on the 60.5 g. of starting material destroyed was 75 percent of the theoretical.

Allyl methacrylate is a clear, colorless, mobile liquid, having a boiling point of 67° C. under 50 mm. pressure, a density of 0.9335 g. per cc. at 20° C. and a refractive index for the yellow sodium line of 1.4358 at 20° C.

*Step 4.*—When it is desired to polymerize allyl methacrylate, the ester is first separated from the hydroquinone or other inhibitor, conveniently by distillation under reduced pressure. The ester is then polymerized in a vessel or mold of the shape desired. If it is desired to prepare the polymer in the interstices of fabrics or on the surface of paper or leather, various proportions of ethyl acetate or other suitable low-boiling diluent can be added to the ester partially polymerized, and the mixture applied to the fabric or other material in a thin layer. The solvent is allowed to evaporate and the resulting film is heated at moderate temperatures for several hours to remove traces of solvent and to complete the polymerization.

High-boiling liquids miscible with the methacrylate, such as diamylphthalate, may be added as plasticizers or softening agents. Miscible polymerizable substances, such as other acrylates or methylacrylates, may be mixed with allyl methacrylate and the mixture subjected to polymerization influences. Polymerization catalysts, such as benzoyl peroxide, may be used instead of heat to expedite polymerization.

Allyl methacrylate when heated alone yields a relatively hard, insoluble and infusible resin. Polymerization of a solution consisting of 5 percent methacrylate and 95 percent acrylate yielded a polymer that was harder and tougher than the resin obtained by polymerizing methyl acrylate alone.

Example 2.

*Step 1.*—Using essentially the procedure of Example 1, there was obtained from 208 g. (2 moles) of alpha-hydroxy-isobutyric acid and 432 g. (6 moles) of beta-methylallyl alcohol, a yield of 220 g. of beta-methylallyl alpha-hydroxy-isobutyrate, this being 70 percent of the theoretical.

Beta-methylallyl alpha-hydroxy-isobutyrate is a clear, colorless, mobile liquid with a pleasant odor. It boils at 78° C. under 16 mm. of mercury pressure and at 20° C. it has a refractive index for the yellow sodium line of 1.4334 and a density of 0.9760 g. per cc.

*Step 2.*—Using a common acetylating agent such as ketene or acetic anhydride, beta-methylallyl alpha-hydroxy-isobutyrate may be converted almost quantitatively into beta-methylallyl alpha-acetoxy-isobutyrate, for instance as follows: 161.2 g. (1.02 moles) of beta-methylallyl alpha-hydroxy-isobutyrate was acetylated by treatment with 116.4 g. (1.14 moles) of acetic anhydride, thereby producing 140 g. (0.70 moles) of beta-methylallyl alpha-acetoxy-isobutyrate, or a yield of 68 percent of the theoretical.

Beta-methylallyl alpha-acetoxy-isobutyrate is a clear, colorless, mobile liquid with a pleasant odor. It boils at 106° C. under 19 mm. of mercury pressure and at 20° C. it has a density of 1.0126 g. per cc. and a refractive index for the yellow sodium line of 1.4321.

*Step 3.*—Using the equipment and procedure described in Step 3 of Example 1, 43.4 g. of beta-methylallyl alpha-acetoxy-isobutyrate was pyrolyzed at 500° C. at the rate of 60 drops per minute (contact time approximately 12.5 seconds). The amount of liquid products obtained was 41.4 g. By fractionation and purification as in Step 3 of Example 1, 22.2 g. of beta-methylallyl methacrylate boiling at 63° C. under 17 mm. pressure was obtained. The yield of beta-methylallyl methacrylate was 73 percent of the theoretical.

Beta-methylallyl methacrylate is a clear, colorless, mobile liquid at 25° C., having a boiling point of 63° C. under 50 mm. pressure, a density of 0.9231 g. per cc. at 20° C. and a refractive index for the yellow sodium line of 1.4400 at 20° C.

*Step 4.*—Using substantially the procedures outlined in Step 4 of Example 1, beta-methylallyl methacrylate can be polymerized to various degrees to obtain useful polymers ranging widely in properties, such as hardness, plasticity, solubility, fusibility, and so forth. Moreover, beta-methylallyl methacrylate can be interpolymerized with many unsaturated compounds, such as acrylic esters, methacrylic esters, acrylonitrile, crotonic acid, crotonic esters, maleic esters and vinyl acetate, to yield various interpolymers of utility. The properties of these interpolymers can be controlled over a wide range by varying the proportions of the monomers used, or by controlling the extent of the polymerization of a given mixture of beta-methylallyl methacrylate and unsaturated compound, or by a combination of the two.

As an example, polymerization of a mixture of 5 percent beta-methylallyl methacrylate and 95 percent methyl acrylate yielded a polymer that was noticeably harder and less soluble than the polymer prepared from methyl acrylate alone.

Having thus described our invention, we claim:

1. The process of manufacturing allyl methacrylate which comprises reacting allyl alcohol with alpha-hydroxy-isobutyric acid, thereby forming allyl alpha-hydroxy-isobutyrate and water, separating the allyl alpha-hydroxy-isobutyrate from the water, reacting the allyl alpha-hydroxy-isobutyrate with an acetylating agent to form allyl alpha-acetoxy-isobutyrate, pyrolyzing the allyl alpha-acetoxy-isobutyrate at a temperature of about 400° to 600° C., whereby allyl methacrylate is formed, and then recovering the allyl methacrylate.

2. The process as defined by claim 1 in which the acetylating agent is ketene.

3. The process as defined in claim 1 in which the acetylating agent is acetic anhydride.

4. The process of preparing allyl methacrylate which comprises pyrolyzing allyl alpha-acetoxy-isobutyrate at a temperature of about 400° to 600° C.

5. The process of preparing an alkenyl methacrylate corresponding to the formula $$CH_2:C(CH_3)COOCH_2C(R):CH_2$$

in which R is selected from the group consisting of hydrogen and methyl, which comprises pyrolyzing the corresponding alkenyl alpha-acetoxy-isobutyrate at a temperature of about 400° to 600° C.

6. The process of preparing a compound selected from the group consisting of allyl methacrylate and beta-methylallyl methacrylate, which comprises pyrolyzing respectively a member selected from the group consisting of allyl alpha-acetoxy-isobutyrate and beta-methylallyl alpha-acetoxy-isobutyrate at a temperature of about 400° to 600° C.

7. The process of manufacturing a compound selected from the group consisting of allyl methacrylate and beta-methylallyl methacrylate, which comprises reacting respectively an alcohol selected from the group consisting of allyl alcohol and beta-methylallyl alcohol with alpha-hydroxy-isobutyric acid, thereby forming the corresponding alpha-hydroxy-isobutyrate and water, separating the alpha-hydroxy-isobutyrate from the water, reacting the alpha-hydroxy-isobutyrate with an acetylating agent to form the corresponding alpha-acetoxy-isobutyrate, pyrolyzing the resulting alpha-acetoxy-isobutyrate at a temperature of about 400° to 600° C., whereby the desired methacrylate is formed, and then recovering the methacrylate.

8. The process of manufacturing beta-methylallyl methacrylate which comprises reacting beta-methylallyl alcohol with alpha-hydroxy-isobutyric acid, thereby forming beta-methylallyl alpha-hydroxy-isobutyrate and water, separating the beta-methylallyl alpha-hydroxy-isobutyrate from the water, reacting the beta-methylallyl alpha-hydroxy-isobutyrate with an acetylating agent to form beta-methylallyl alpha-acetoxy-isobutyrate, pyrolyzing the beta-methylallyl alpha-acetoxy-isobutyrate at a temperature of about 400° to 600° C., whereby beta-methylallyl methacrylate is formed, and then recovering the beta-methylallyl methacrylate.

9. The process as defined in claim 8 in which the acetylating agent is acetic anhydride.

10. The process as defined in claim 8 in which the acetylating agent is ketene.

11. The process of preparing beta-methylallyl methacrylate which comprises pyrolyzing beta-methylallyl alpha-acetoxy-isobutyrate at a temperature of about 400° to 600° C.

CHESSIE E. REHBERG.
CHARLES H. FISHER.